US008628409B2

(12) United States Patent
Clark et al.

(10) Patent No.: US 8,628,409 B2
(45) Date of Patent: *Jan. 14, 2014

(54) SEARCH ENGINE PROVIDING AN OPTION TO WIN THE ITEM SOUGHT

(75) Inventors: Scott Clark, New York, NY (US);
Armen Djourian, New York, NY (US);
Moujan Vahdat, New York, NY (US)

(73) Assignee: PICKAPIN.COM, Bronx, NY (US)

( * ) Notice: Subject to any disclaimer, the term of this patent is extended or adjusted under 35 U.S.C. 154(b) by 621 days.

This patent is subject to a terminal disclaimer.

(21) Appl. No.: 12/906,760

(22) Filed: Oct. 18, 2010

(65) Prior Publication Data

US 2011/0124403 A1      May 26, 2011

Related U.S. Application Data

(63) Continuation of application No. 09/759,103, filed on Jan. 12, 2001, now Pat. No. 7,818,205.

(51) Int. Cl.
*G06F 17/00*        (2006.01)
(52) U.S. Cl.
USPC ............................................................ 463/25

(58) Field of Classification Search
USPC ...................... 463/1, 16–25, 42; 705/14.1, 26
See application file for complete search history.

(56) References Cited

U.S. PATENT DOCUMENTS

| 6,443,843 B1 * | 9/2002 | Walker et al. ................... 463/42 |
| 2003/0054888 A1 * | 3/2003 | Walker et al. ................... 463/42 |

* cited by examiner

*Primary Examiner* — Ronald Laneau
(74) *Attorney, Agent, or Firm* — Ward & Zinna, LLC

(57) ABSTRACT

A system and method of enhancing shopping search engines and games of chance by permitting the user to search for and locate the prize the user seeks to win or buy, and then playing a game of chance to win the specified item, or going to the web site to buy. The system calculates a dynamic probability of winning the item based on several factors. The system randomly generates a trial outcome of an event trial and an outcome indicator, with the probability of the event trial generating a winning trial outcome corresponding to the calculated probability of winning. The outcome indicator represents either a winning trial outcome or a losing trial outcome. In response to a winning trial outcome, the system purchases the item for the user from the independent third-party retail vendor at no cost to the user.

20 Claims, 13 Drawing Sheets

SEARCH ENGINE PROVIDING AN OPTION TO WIN THE ITEM SOUGHT

CROSS-REFERENCE TO RELATED APPLICATIONS

This continuation application claims the benefit of non-provisional application Ser. No. 09/759,103, filed Jan. 12, 2001, the entire content of which is herein incorporated by reference.

FIELD OF THE INVENTION

This invention relates to the field of online shopping and gaming, and, more particularly, permitting the user to search for and locate the prize the user seeks to win or buy.

BACKGROUND OF THE INVENTION

Shopping search engines accept descriptions of a desired product or service that a user wishes to purchase, and return indications of dealers in the product or service. The user may then purchase the product or service from a dealer indicated by the search engine. The most common such shopping search engines are price comparison search engines such as mysimon.com, which return indications of dealers together with associated prices. Such shopping search engines lack the excitement provided by games of chance. Other shopping search engines include shopnow.com, bottomdollar.com, dealtime.com, and anaconda.net.

Conversely, games of chance do not permit the user to search for the prize to be won. The range of prizes to be won in any particular game of chance have generally been small, and determined by the sponsor of the game. Typically, only a single prize or a fixed range of prizes may be won. Such sites include Iwon.com, Iwin.com, Freelotto.com, Luckysurf.com, and Treeloot.com. Viewing advertisements typically is a prerequisite of play, and may increase a user's chance of winning at these sites.

Some sites allow users to win or buy one of a small number of predetermined prizes. Such sites include Bigprizes.com and Winday.com. None of these sites permits a user to search for an arbitrary item or service and attempt to win the item or service.

SUMMARY OF THE INVENTION

In one aspect, the system of the present invention enhances shopping search engines and games of chance by permitting the user to search for and locate the prize the user seeks to win or buy, and then playing a game of chance to win the specified item, or going to the web site to buy.

In another aspect, the system of the present invention adjusts the probability of a user's winning a game of chance in accordance with the revenue that the system has received from the user.

In one preferred embodiment, the invention comprises a method of providing a game of chance comprising the steps of: receiving electronic signals representing search parameters descriptive of a product or service; transmitting electronic signals representing dealers in the product or service and associated prices; electronically calculating a probability of winning the product or service if the user selects to play the game; electronically generating a pseudo-random outcome having a probability corresponding to the calculated probability; based on the pseudo-random outcome, purchasing the product or service for a user.

In another preferred embodiment, the invention further comprises calculating the probability so as to increase with the value of derived from the user's interaction with the system.

In another preferred embodiment, the invention further comprises indicating the outcome by displaying a user-chosen number and a comparison number, such that a winning outcome is indicated by displaying a comparison number that matches the user-chosen number, and a losing outcome is indicated by displaying a comparison number that does not match the user-chosen number.

In another preferred embodiment, an increased probability of winning is indicated by displaying a comparison number having at least one digit matching the corresponding at least one digit of the user-selected number.

In still another preferred embodiment, the probability of winning is different than one divided by ten raised to the power of the number of digits in the comparison number.

BRIEF DESCRIPTION OF THE DRAWINGS

A further understanding of the invention can be obtained by reference to a preferred embodiment set forth in the illustrations of the accompanying drawings. Although the illustrated embodiment is merely exemplary of systems and methods for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the invention, reference is now made to the following drawings in which.

DETAILED DESCRIPTION OF THE INVENTION

The invention may be understood more readily by reference to the following detailed description of preferred embodiment of the invention. However, techniques, systems, and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. It must be noted that, as used in the specification and the appended claims, the singular forms "a", "an", and "the" include plural referents unless the context clearly indicates otherwise.

Comparison Shopping Module

Figure 1:
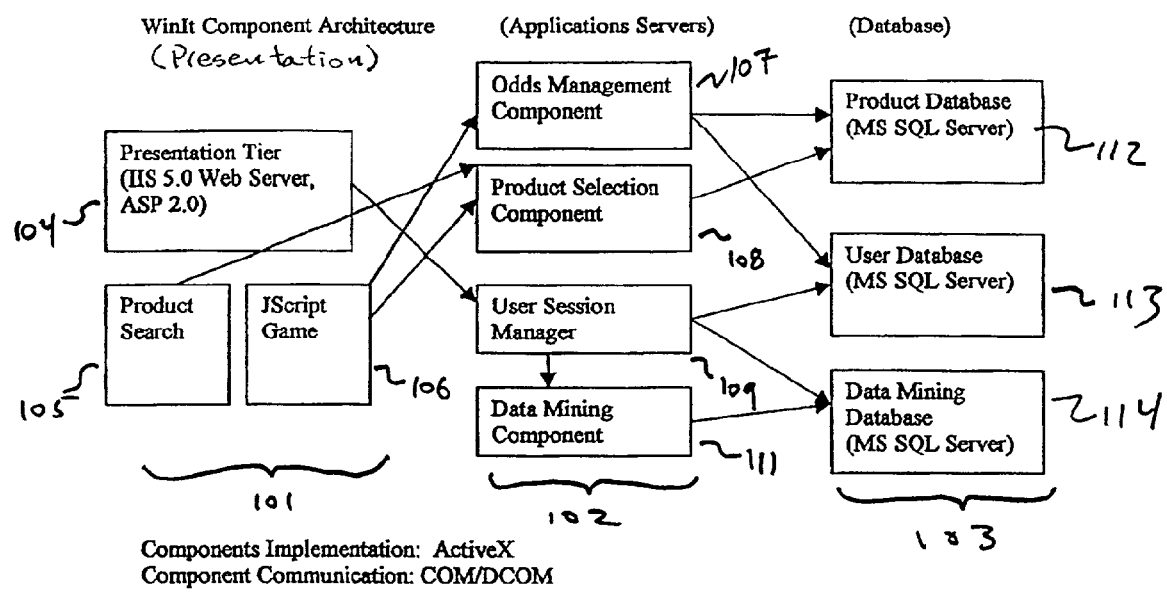
FIG. 1 schematically illustrates the architecture of an example preferred embodiment.

FIG. 1 depicts the system architecture for an example preferred embodiment of a system implementing the present invention. The system shown in FIG. 1 retrieves item or service and price information from third-party web sites offering items for sale and allows the user to search for the lowest prices for an item or service. After locating an item or service of interest, the user may purchase the item, service, or attempt to win the item or service via the game aspect of the system described below in connection with system user displays.

The system comprises three tiers—a presentation tier 101, an application tier 102, and a database tier 103. The presentation tier comprises the Microsoft® IIS 5.0 Web Server with ASP 2.0, along with mobile logic that is transmitted to the browser of a user, including product search logic 105 and Jscript and Java game logic 106. The Web server and mobile logic interact with the applications tier as indicated in FIG. 1. The applications tier comprises an odds management component 107, a product selection component 108, a user session manager 109, and a data-mining component 111. The applications tier interacts with the presentation tier 101 and the database tier 103. The database tier 103 comprises a product database 112, a user database 113, and a data-mining database 114.

Application tier components are Microsoft ActiveX components, preferably written in C++ in conformance with the COM/DCOM distributed object model. The odds management component 107 performs odds calculations and random trials for game play as described more fully below. The product selection component 108 retrieves product information from the product database for presentation to the user when searching for, attempting to win, or purchasing products available through the system. The user session manager 109 maintains state information across HTTP requests, allowing user sessions to be tracked. The data mining component 111 gathers product information from third-party websites for use in the system as described below.

The database layer is preferably implemented in Microsoft® SQL Server®. The product database 112 stores product information gathered by the data-mining database 114. The user database 113 stores user profiles, user names, and passwords. The data mining database 113 stores product information gathered by the data mining component 111 from third-party databases. Product information from the data-mining database 114 is periodically copied into the product database 112.

The system shown in FIG. 1 is preferably deployed in a distributed environment, comprising a Web server computer and a database server computer. The Web server computer preferably comprises an Intel Pentium 3 computer connected via Ethernet to an Internet-connected router. The Web server computer preferably runs Microsoft Windows Server 2000 and Microsoft®IIS 5.0 Web Server with ASP 2.0. The database server computer preferably comprises an Intel Pentium 3 computer on the same Ethernet network as the Web server, running Microsoft® Windows Server 2000 and Microsoft® SQL Server® v 7.0.

Figure 3:
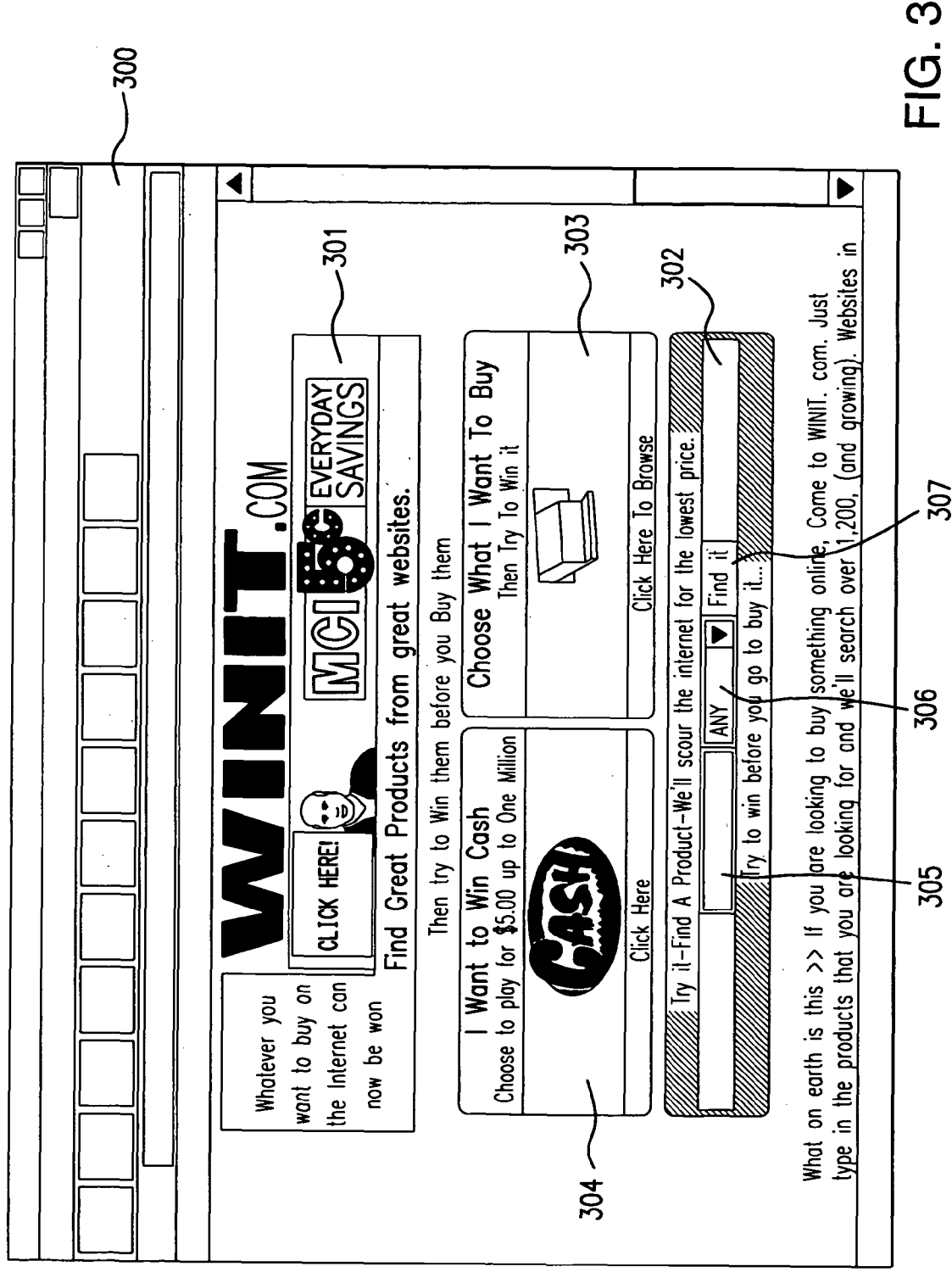
FIG. 3 illustrates an example display of an example preferred embodiment.

FIG. 3 depicts a preferred home web page of the present invention. The advertising banner 301 displays advertisements of third-parties on a rotating basis either each time the front-end web page is refreshed by the user or on a predetermined time interval. Each of the web pages generated by the system during a user's session displays an advertising banner 301, for which advertisers are charged.

Figure 2A:
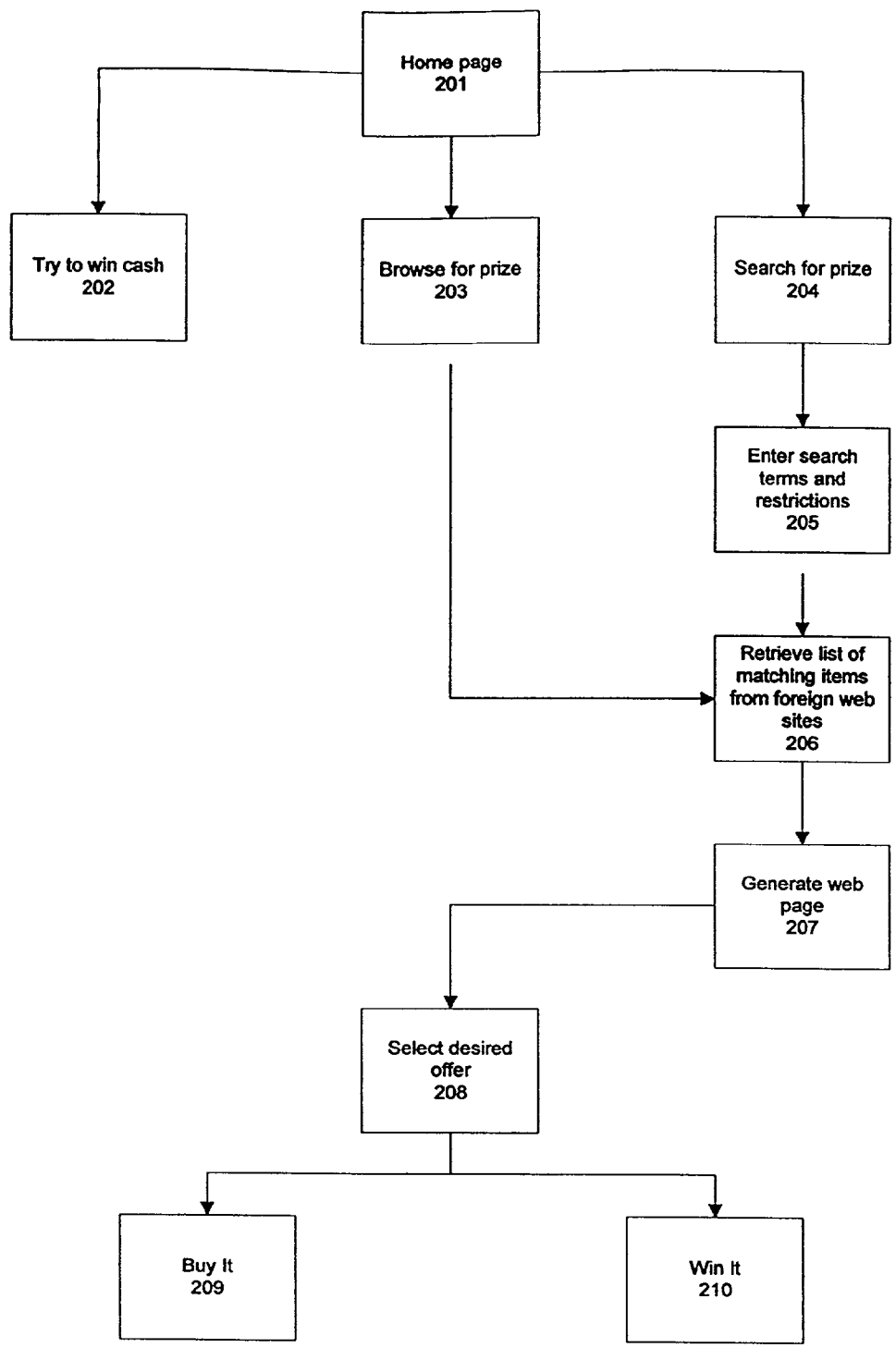
FIG. 2a is a flow chart that schematically illustrates the use of an example preferred embodiment.
Figure 2B:
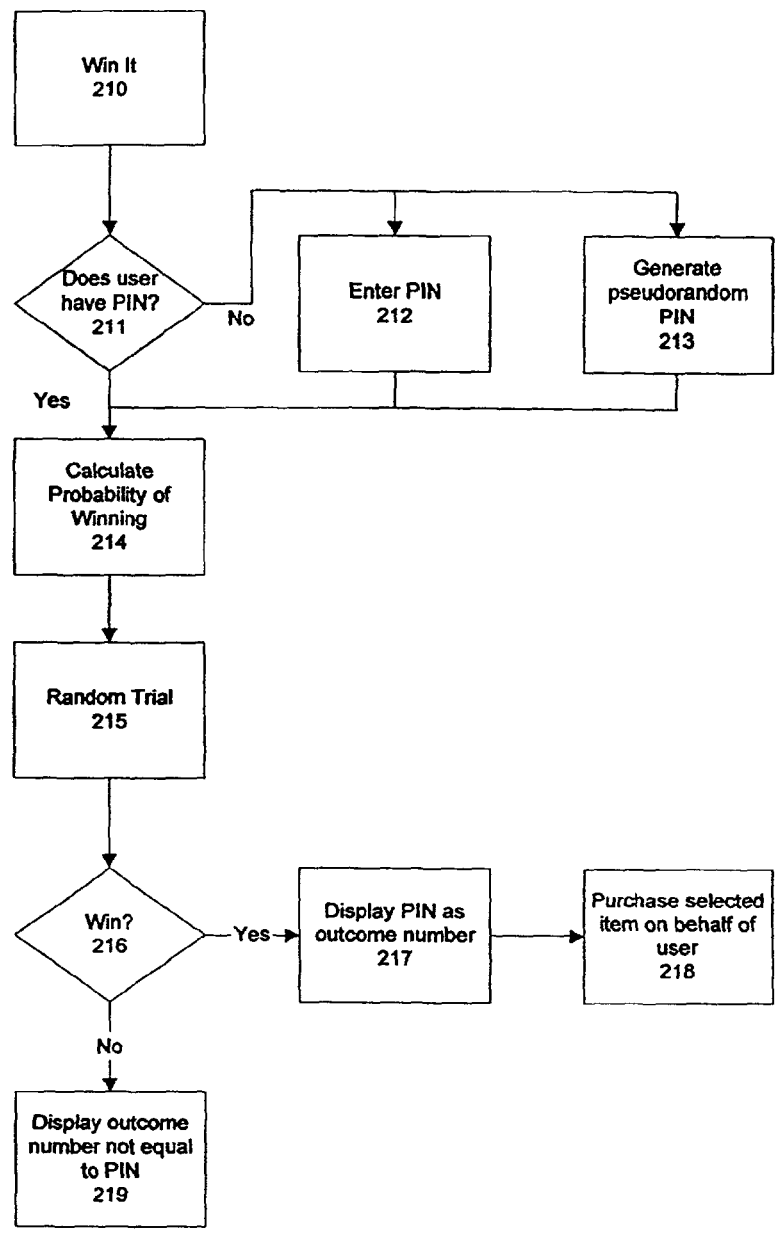
FIG. 2b is a flow chart that schematically illustrates the use of an example preferred embodiment.

The use of the system is schematically illustrated in FIGS. 2a and 2b. To begin, the user navigates to the home Web page for the system 201. From the home page, the user may attempt to win cash 202, browse for an item or service to attempt to win 203, or search for an item or service to attempt to win using a search engine interface 204. After the user locates an item by browsing 203 or searching with search terms and restrictions 204, 205, the system retrieves a list of matching items or services available for sale on third-party Web sites along with pricing and other information 206 and displays the information to the user in a dynamically generated Web page 207. The user may then select the particular offer they desire 208 and either buy the offered item or service from the offering Web site 209 or attempt to win it using the game aspect of the invention 210.

If the user attempts to win the offered item or service 210, the system determines whether the user has an existing PIN number 211 for use in signifying the outcome of a game of chance. If not, the user may select a PIN by entering a number 212, or having a pseudo-random PIN generated for the user 213. When the user has a PIN, the system calculates a probability of winning the selected item or service based on factors including the items cost, the current prize budget available, and the revenues derived from this user 214. The system then generates a random trial having the calculated probability of occurrence 215. If the trial results in a win for the user, the system displays the user's PIN as an outcome number 217 and causes the selected item to be purchased for the user 218. If the trial does not result in a win for the user, an outcome number not equal to the user's PIN is displayed 219.

From the home Web page depicted in FIG. 3, the user may click on the browse-for-prize hyperlink 303, the win-cash hyperlink 304 or may enter information in the search engine interface 302. At any time during the user's session in the preferred embodiment, the user may select and search for a new product or service by using the product search engine interface 302.

To use the product search engine interface 302, the user queries the search engine by entering a description of a desired product or service in the text box 302. In addition, the user may select search restrictions by clicking on the restriction list 306. For example, the user might search only electronics or games. Once the product or service title is entered in text box 305, the restrictions (if any) have been selected from the restriction list 306, the user may search for the item by clicking on the "Find It" button 307. The "Find It" button 307 comprises a portion of the product search logic 105 of the presentation layer 101, and causes a request to be transmitted to the product selection component 108, which in turn queries the product database 112. In response, the product database is searched for items meeting the search criteria entered 160.

The search engine searches the product database 112 for a set of third-party web sites 100 that sell the desired product or service, along with the price for the product or service and preferably other helpful information such as a picture of the product, a description of the service, product specifications, and availability and shipping options.

In a preferred embodiment, the search engine looks up the product or service in an indexed table of a selected third-party web sites 100 that have been previously indexed. Preferably, the selected third-party web sites 100 comprise only the web-sites of businesses that have relationships with the proprietors of the system, for which the selected third-party web sites are charged.

The index of third-party web sites may be generated with a spider or web crawler program or service such as the services available from Inktomi® or Excite®, or the WebL or Harvest programs. In the alternative, such programs can be custom designed and written by those skilled in the art, as described in "Programming Bots, Spiders, and Intelligent Agents in Microsoft Visual C++" by David Pallmann. Alternatively, the search engine may pass the description to search engines on selected sites 100 and retrieve and consolidate the results. A program such as WebL may be used for this purpose. In a preferred embodiment, the index is generated by replicating item databases from the select third-party web sites, via data transmission of database files, which are translated into a standard format by the data mining 102 component and stored in the product database 112.

Using the data retrieved from the product database 112 in response to the user's query, the product selection component 108 dynamically generates 180 a price comparison Web page that presents the price and other data in a format that allows the user to compare the offers made by the third-party web sites 100. Each third-party web site is preferably presented as a separate entry in a table on the web page, the entry comprising a description of the web site, item or service and price, along with a hyperlink to a page for purchasing the item or service. In a preferred embodiment of the invention, the system also displays review or rating information about the product, service or third-party web site 100 itself. This review or rating information may be generated by prior users of the system or may be incorporated from third-parties such as Consumer Reports or gomez.com.

The user may click on the user's choice of hyperlink that corresponds to a desired offer 210. The system presents a web page that displays the desired product or service and provides the user with the option of purchasing the desired product or service and the option of participating in the game aspect of the present invention in an attempt to win the desired product or service.

Figure 4:
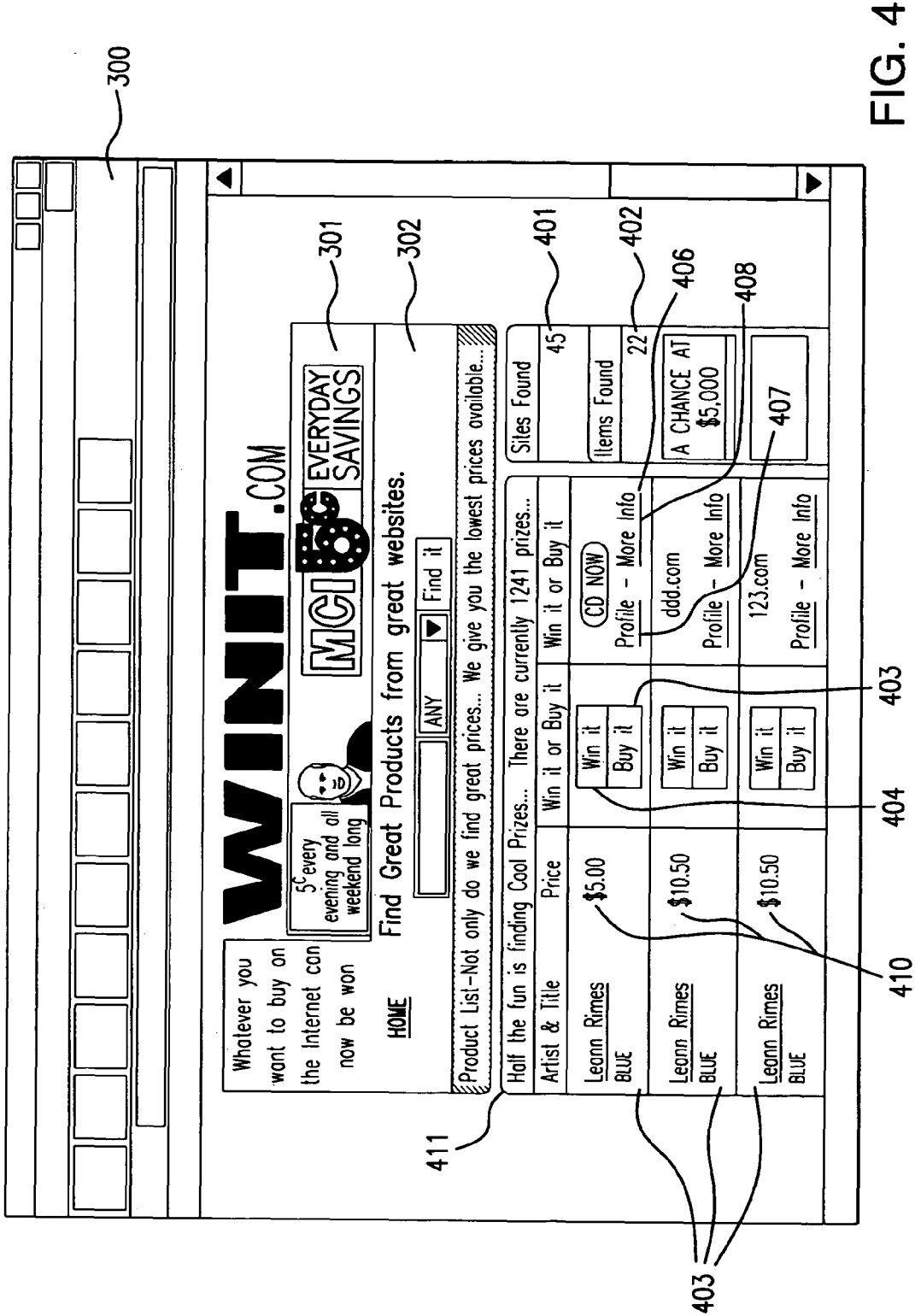
FIG. 4 illustrates an example display of an example preferred embodiment.

FIG. 4 depicts an example preferred dynamically generated price comparison Web page. The number of different sites found which offer the desired product or service is displayed in the "Sites Found" box 401. The number of different items found by the search engine is displayed in the "Items Found" box 402. This information is displayed so that the user can judge the effectiveness of the search, allowing the user to adjust the text or restrictions of the user's search using the search engine interface 302. Each third-party web site 100 that offers the desired product or service and which has been located by the search engine is displayed as a row in the table 411.

In the preferred embodiment, each row in the table 411 includes a hyperlink to the offer 403, the associated price 410, an indicator of the offeror 406 with associated profile 407 and "more info" 408 links, and "Win It" 404 and "Buy It" links. The offer hyperlinks 403 are arranged such that offer with the lowest price is displayed on the top row. When the user selects the "Buy-It" hyperlink 405, the product selection component 108 causes the user's browser to retrieve the appropriate page for purchasing the item on the third-party web-site 100 of the user's choice. By clicking on the "Win It" hyperlink 404, the user's browser is caused to retrieve a page that displays the game aspect of the present invention discussed in greater detail below. Additional information regarding the product or the merchant can be obtained by clicking on the "Profile" hyperlink 407 or the "More Info" hyperlink 408.

URL-Based Embodiment

According to another aspect of the present invention, the user can access the system in the manner described above, but instead of entering a desired a product or service into the search engine interface, the user can locate a product by entering a particular web-site or URL address into the system. The system then acquires the price and other helpful data and gives the user the option of purchasing the desired product or service or the option of winning the product or service by participating in the game aspect of the present invention discussed below. This aspect of the system is useful for persons desiring to purchase products or services from classified advertisements.

In a preferred embodiment of the invention, the user, after entering a specific URL address, may invoke the search engine to determine whether other third-party web-sites offer the desired product or service. If this is the case, the system collects and displays the price and other data in a dynamically generated Web page and the user proceeds as described above.

Auction Module Embodiment

According to another aspect of the present invention, users who participate in on-line auctions are provided the opportunity to win the product or service they are bidding on.

Using a web crawler or database replication, the system retrieves data from online auction systems, such as yahoo.com or ebay.com, and locates auctions that are about to close. The system stores the URLs for such auctions, revisits auctions after they have closed to determine the winners. The system sends an e-mail to each winner with a message and a hyperlink. The hyperlink is generated dynamically and includes an identifier of the bidder and the item that was being bid on. If the email recipient (the auction winner) clicks the hyperlink, the email recipient's browser causes the system to retrieve the auction information and present it in a dynamically generated web page from which the recipient can play a game in accordance with the game aspect of the invention described more fully below. If the auction winner plays and wins the game, the system reimburses the auction winner for the price of the auction item. In a preferred embodiment, a check for the reimbursement amount is mailed to the auction winner who wins the game.

Alternatively, users may subscribe to a "win your auction item watch" by supplying the system with their auction user name, e-mail address and an identifier of the auction site that they use. The system regularly monitors the auctions of users who subscribe, and solicits them via email to try and win items they have bid on by participating in the game aspect of the present invention.

Item Index Module

In another aspect of the present invention, the user can browse through an index of pre-selected items. The user can navigate through the system's index of pre-selected items by clicking on descriptive hyperlinks grouped by category. Upon selecting an item that the user desires, the product selection component 108 is invoked to search the product database 112 for third-party web sites, which offer the desired item for sale.

The results are displayed, and the user can opt to purchase the item or participate in the game aspect of the present invention in an attempt to win the item.

Figure 5:
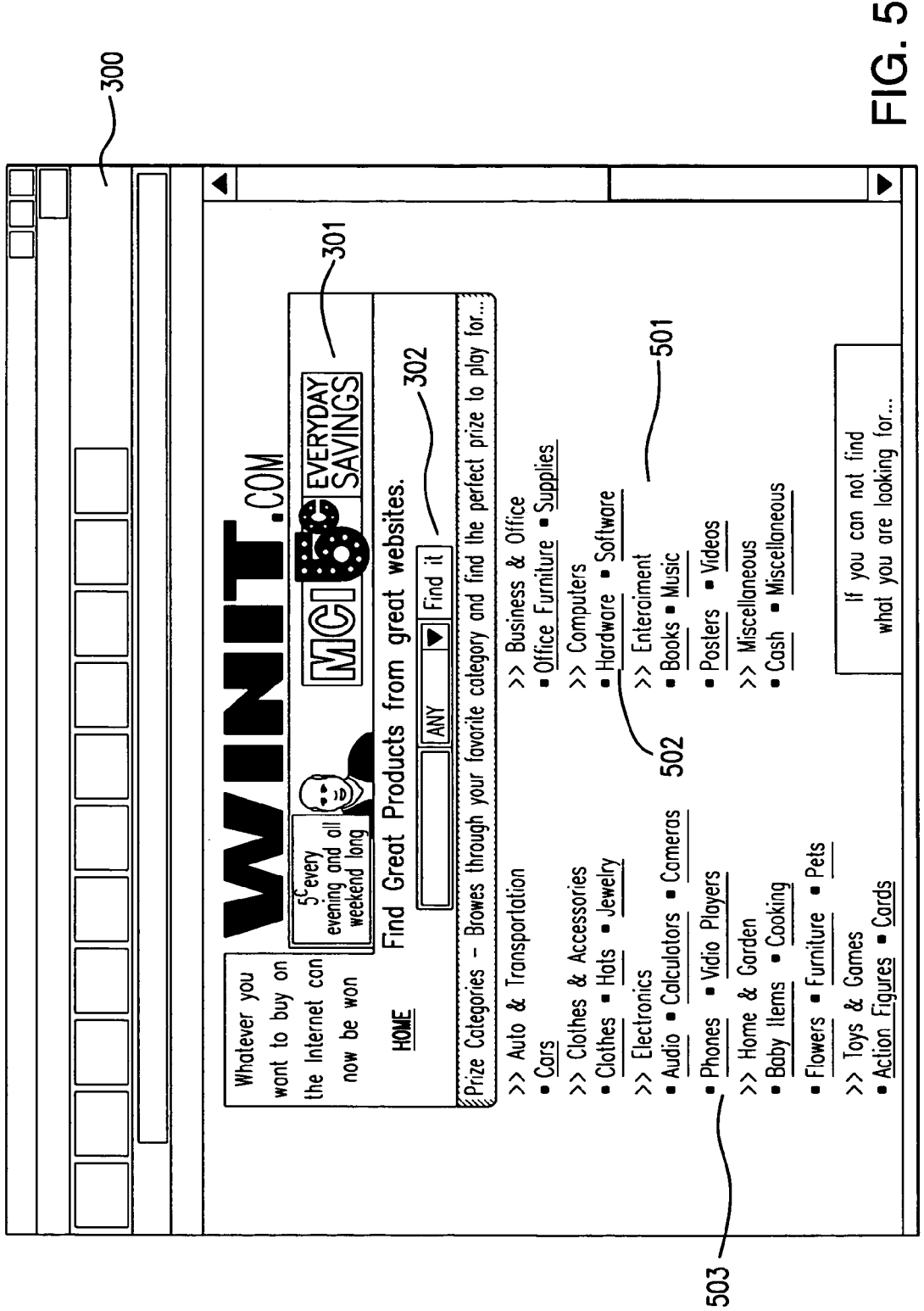
FIG. 5 illustrates an example display of an example preferred embodiment.
Figure 6:
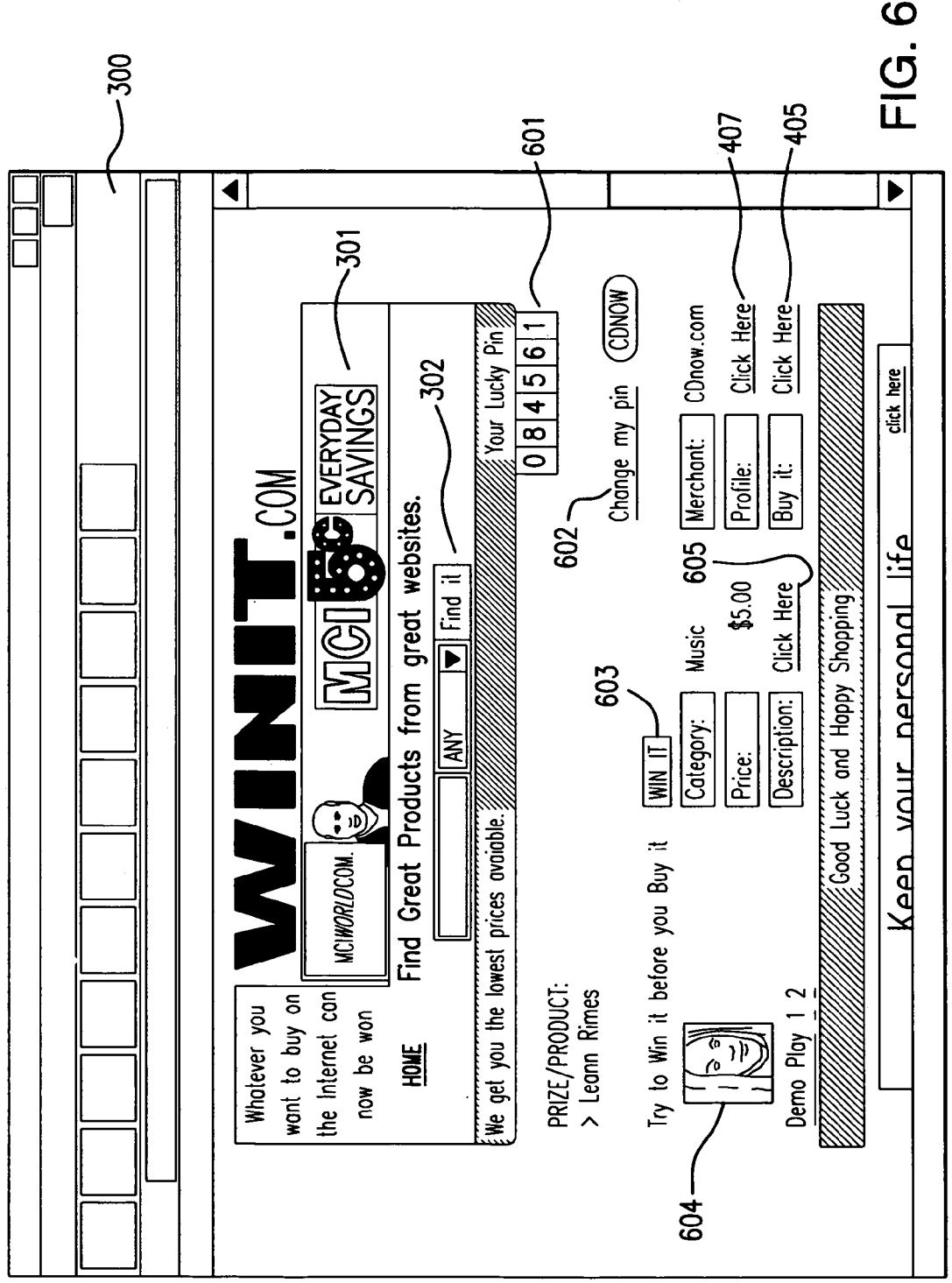
FIG. 6 illustrates an example display of an example preferred embodiment.

FIG. 5 depicts an item index Web page of a preferred embodiment of the present invention. The item index is arranged in a category index 501. In this example preferred embodiment, the user may obtain more information regarding the available items in the categories of computer hardware or phones by clicking on hyperlinks such as 502 and 503.

Search Results Display

After the user has determined an item to retrieve from the search engine by entering a query or browsing, the search results are displayed as illustrated for an example preferred embodiment in FIG. 4. Vendor descriptions for the item description are displayed 403, together with corresponding prices 410, and merchant identifiers 406. The user may acquire additional information about the vendor by accessing the vendor's profile stored on the system by selecting link 407. Additional information from the vendor concerning the item may be retrieved via the "more information" link 408.

The user may buy the item from the vendor by selecting the corresponding "Buy It" link 405. The hyperlink comprises a URL for a page on the vendor's web server from which the user may purchase the selected item. Thereafter the user follows the procedures set forth by the selected web site to purchase the desired product or service.

Figure 7:
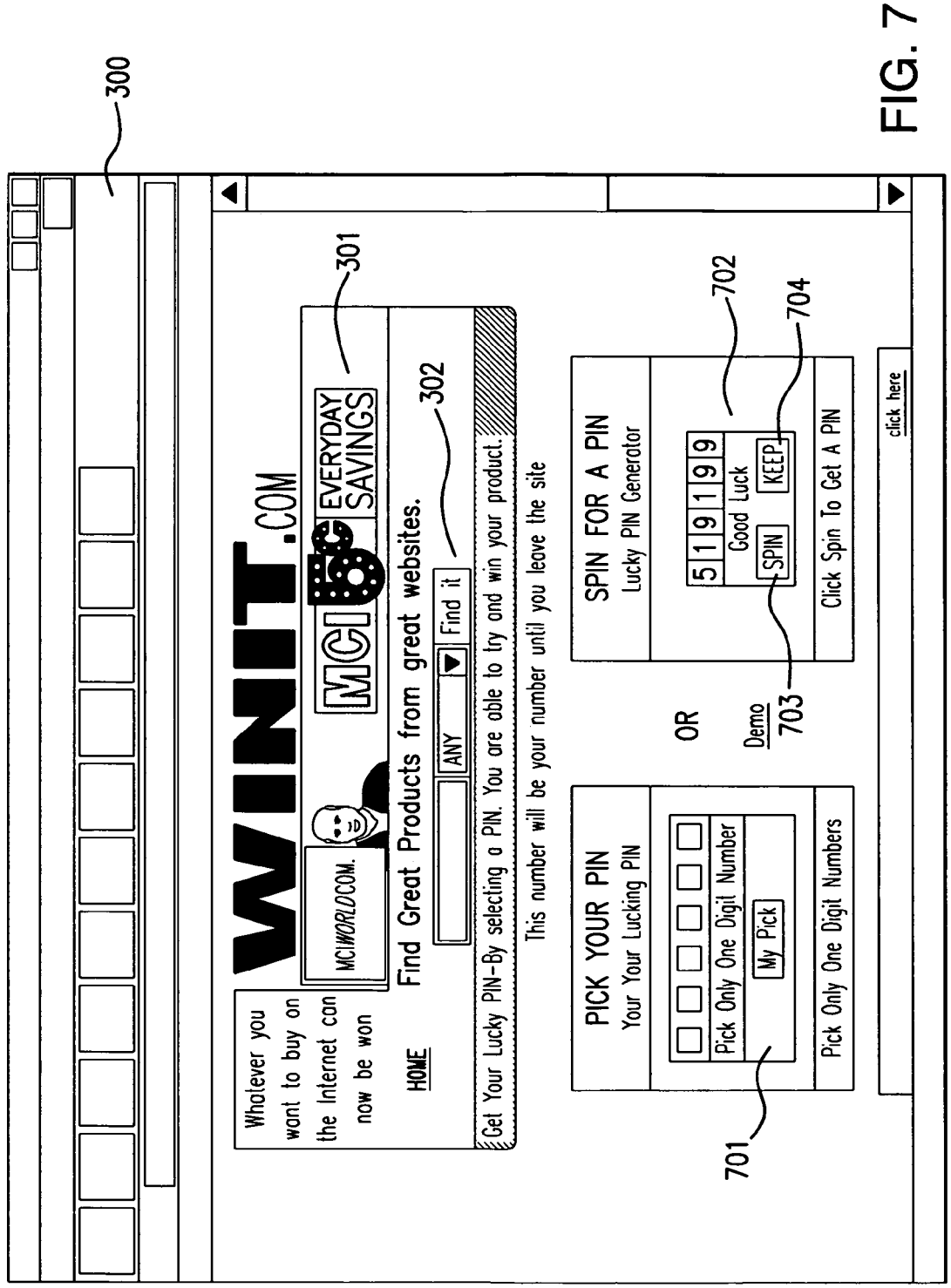
FIG. 7 illustrates an example display of an example preferred embodiment.

The user may instead opt to attempt to win the desired product or service by selecting the "Win It" button 404 displayed corresponding to the user's selected vendor for an item. When the "Win It" button is selected, the user session manager 109 system uses a cookie stored on the user's computer, or credentials based on the user's login to query the user database 113 to determine whether the user has a current PIN number. If the user does not have a current PIN number, the display illustrated in FIG. 7 is presented. The user may then enter a PIN using form 701, or randomly select a PIN using applet 702, which comprises a portion of the Jscript/Java game logic 106. Applet 702 causes the digits displayed therein to scroll past randomly in response to the "SPIN" button 703 and slow to a stop at a pseudo-randomly determined number. The user may select a new pseudo-random number by selecting the "SPIN" button 703 again, or select the pseudo-randomly generated PIN by selecting the "KEEP" button 704.

Figure 8:
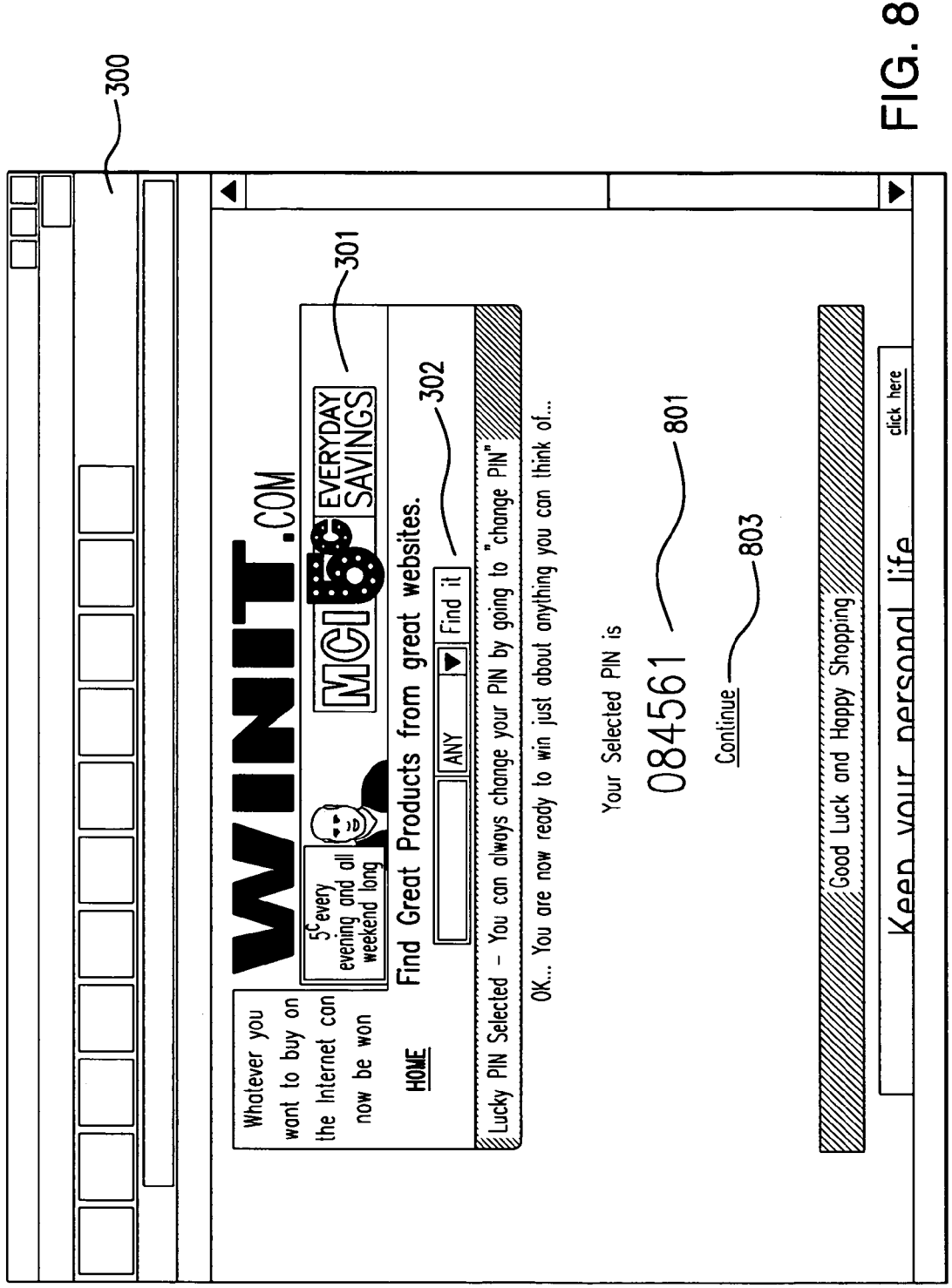
FIG. 8 illustrates an example display of an example preferred embodiment.

In response to the user selecting a PIN number using form 701 or applet 702, a selected-pin page similar in form to that illustrated in FIG. 8 is displayed, prominently displaying the user's selected PIN number 801. To continue playing, the user selects the "Continue" link 803.

Figure 12:
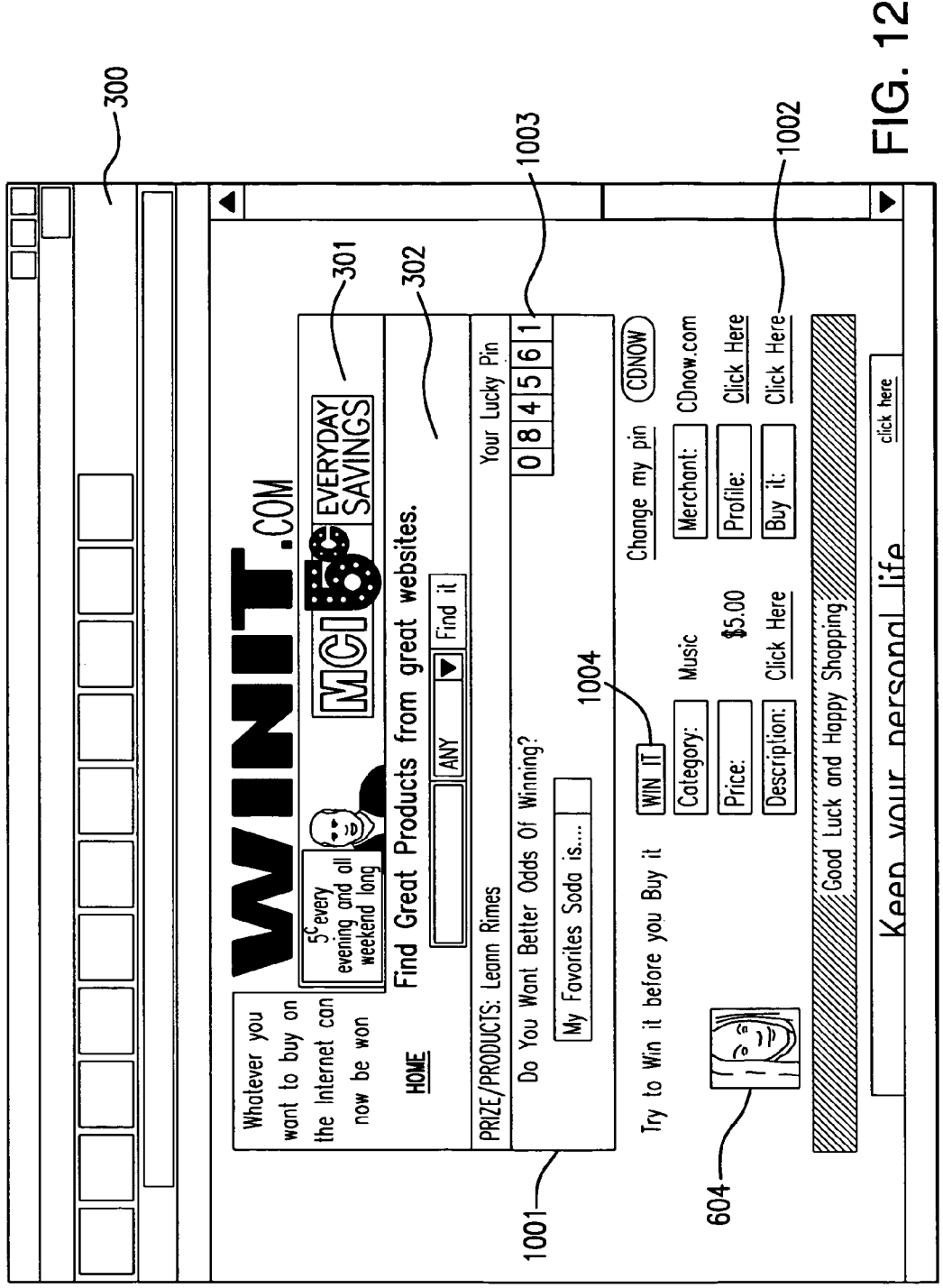
FIG. 12 illustrates an example display of an example preferred embodiment.

The display illustrated in FIG. 12 is presented in response to the "Continue" link 803, or in response to the "Win It" button if the system determined that the user had a current PIN number in response to the user selecting the "Win It" button 404. In FIG. 12, information describing the selected item and vendor is displayed, together with a link permitting the user to purchase the item from the vendor 1002. In addition, a "Win It" button 1004 is presented, permitting the user to invoke the odds management component 107 to cause a random trial to be performed. If the outcome of the trial is a win for the user, the odds management component 107 retrieves the user's shipping address from the user's profile in the user database 113 and the system purchases and pays for the item on behalf of the user.

Figure 9:
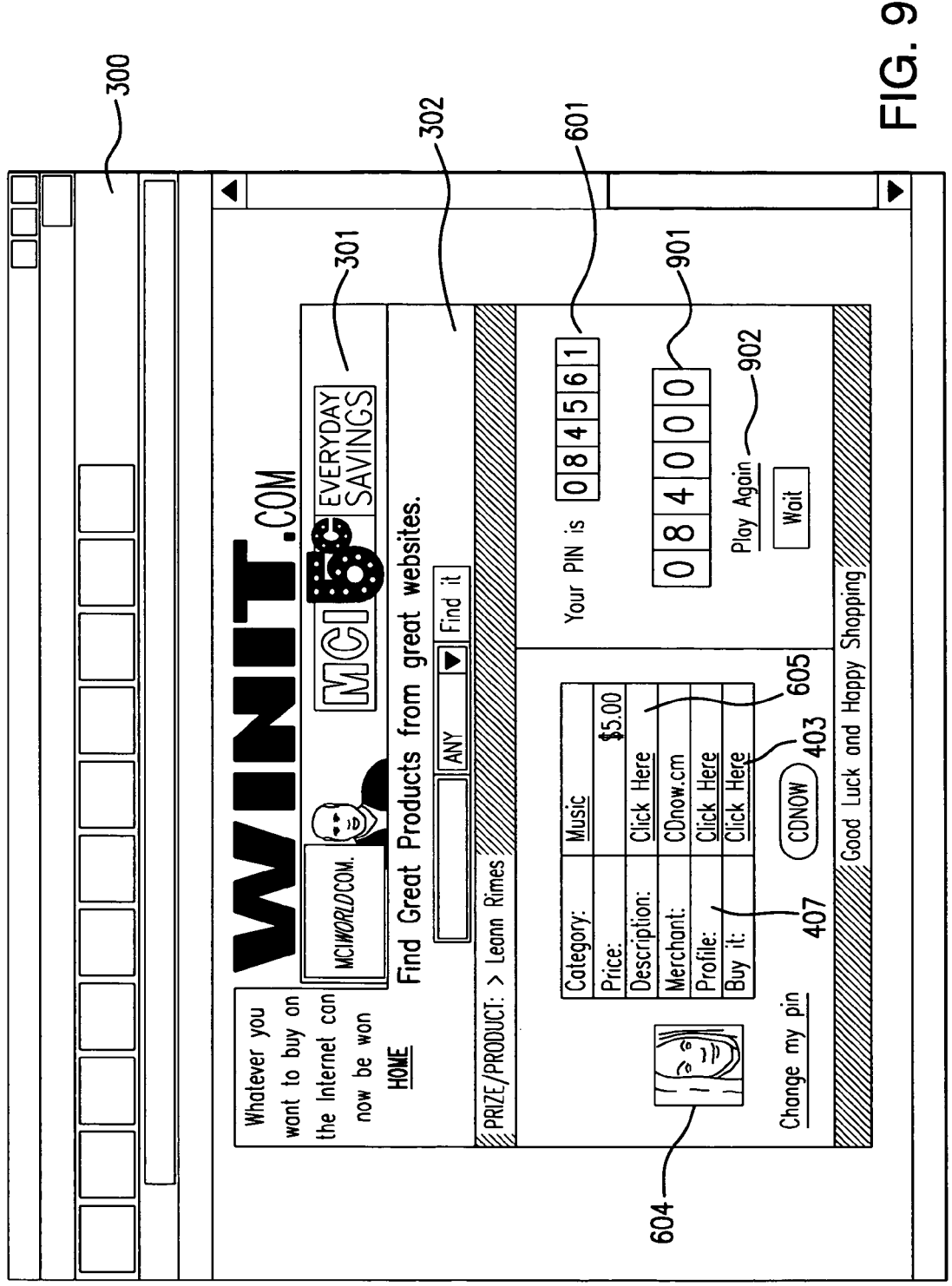
FIG. 9 illustrates an example display of an example preferred embodiment.

The results of the trial are provided to the user in a dynamically generated Web page illustrated in FIG. 9. If the outcome is a win for the user, the odds management component 107 causes the outcome number displayed in outcome applet 901 to match the user's PIN 601. If the outcome is a non-win, the outcome number displayed in outcome applet 901 will differ from the user's PIN 601 as shown in FIG. 9. In a preferred embodiment, the outcome applet causes the displayed numbers to scroll by pseudo-randomly until settling one digit at a time on the outcome number. The user may cause additional trials to be performed by selecting the "play again" link 902. After each trial, a display resembling FIG. 9 is displayed, along with updated outcome and advertising. Advertisers are charged for each advertisement display, resulting in additional revenue for the system for each trial. The odds management component tracks the revenue generated during a particular user session and uses the information to calculate the user's probability of winning as described below.

The odds management component 107 controls the probability of a user winning a desired product or service. A variety of probability models and rules may be applied by the odds management component 107 to determine the probability of winning. Preferably, the odds management component 107 is configured to determine an overall prize budget in real-time, and the user's probability of winning a desired product or service is varied by the odds management component 107 as a function of the ratio of the product or service's price to the current prize budget.

In this preferred embodiment, the odds management component 107 increases the prize budget in real time as revenue accrues to the site through advertising. As more users use the site, advertising revenue increases proportionately. Preferably, each advertisement displayed causes a fixed increment to the prize budget, so that the ratio of the prize budget to users remains approximately fixed as system use increases. Other sources of system revenue may also be allocated to the prize budget. The costs of awarded prizes are deducted from the prize budget, so that the probability of any particular user winning any particular item will fluctuate with time.

The odds management component 107 also preferably adjusts each user's probability of winning based on user's session history retrieved from the user database 113, including the number of numbers the user has "locked in" (as explained below) and the total advertising earnings derived from the user during this session. Preferably, the odds management component 107 calculates a probability of each user's winning a particular item so that the expected value of the user's estimated attempts to win during any period are less than or equal to the expected value of the user's contributions to the prize budget for the same period.

In one preferred embodiment, the odds management component 107 calculates the probability of winning for the user as $$\text{Probability of winning} = P = \frac{Pa * Pt * Pm}{N} + Pu$$

where

N is the number of users currently online.

$P_a$ is a probability factor that varies with the cost of the selected prize in relation to the total cost of all prizes available on the system, such that $P_a$ approaches zero as the cost of the selected prize approaches the total cost of all prizes, and $P_a$ approaches 1 as the cost of the selected prize approaches zero.

$P_t$ is a probability factor that varies with the total current prize budget, such that $P_t$ approaches zero as the cost of the selected prize approaches the maximum allowable prize amount, and $P_t$ approaches 1 as the cost of the selected prize approaches zero.

$P_m$ is a probability factor that varies with the ratio of the current prize budget to the total funds received by the system, such that $P_m$ approaches one as the current prize budget approaches the maximum income received by the system and $P_m$ approaches zero as the current prize budget approaches the maximum income received by the system minus the maximum allowable prize budget.

$P_u$ is a probability factor that varies with the user's behavior within a session.

Preferably $$Pa = 1 - \frac{A_p}{\sum_{i=1}^{n} Ai} \text{ if } A_p < T*K \text{ and } P_a > W\min$$

$$P_a = W\min$$

otherwise
where
  $A_p$=cost of the selected prize
  $A_i$=cost of the $i^{th}$ prize $$\sum_{i=1}^{n} Ai = \text{total cost of all prizes in database}$$

$W_{min}$=minimum probability of winning
and preferably $$Pt = \frac{T*K - Ap}{T*K} \text{ if } P_t > W_{min} \text{ where } A_p < T*K$$

and $$P_t = W_{min}$$

otherwise
where
  T=current prize budget
  K=proportion of the current prize budget that may be awarded, 0<K<1

And where $$P_m = \frac{\frac{T}{T_m} + K - 1}{K} \text{ if } P_m > W_{min} \text{ where } T < Tm$$

and $$P_m = W_{min}$$

otherwise
where
  $T_m$=maximum prize budget to date.

And preferably $$P_u = P_{u1} * P_{u2} * P_{u3}$$

Where $$P_{u1} = P_0 * (1 - P_0)$$

$$P_0 = \frac{P_a * P_t * P_m}{N}$$

$$P_{u2} = \frac{N\max + N\min - Nc}{N\max}$$

N max=maximum number of spinning digits
N min=minimum number of spinning digits
Nc=current number of spinning digits $$P_{u3} = 1 - e^{-E/Ap}$$

where
  E=the total advertising earnings derived from the user during this session.

When the Win-It button 1004 is selected, the Jscript/Java Game logic invokes the odds management component 107, which calculates a pseudo-random event trial having probability of returning true equal to the calculated probability of winning P. If the pseudo-random event trial returns true, the odds management component 107 causes a winning display to be presented to the user. Otherwise, the odds management component 107 causes a losing display to be displayed to the user.

The probability of winning is preferably independent of the outcome number and PIN. The outcome of the trial determines whether a winning display or a losing display is presented to the user. Preferably, a different outcome number is presented after each trial. Preferably, losing outcome numbers are selected using a pseudo-random number generator having an output distribution that is independent of and differently distributed from the pseudo-random outcomes used to perform random trials.

Before each trial, the user may be given an opportunity to increase their odds of winning For example, the user may be asked to complete a brief consumer survey, visit an advertiser's web site, or voluntarily perform some other similar task for which the system is compensated by third-parties. A portion of this revenue is allocated to the prize budget, and the odds management component 107 increases the user's probability of winning in response. For example, the user may be presented with the opportunity to increase the user's odds of winning by completing a survey using survey interface.

Figure 10:
FIG. 10 illustrates an example display of an example preferred embodiment.

Alternatively, or in addition, such opportunities are presented to the user at random intervals in response to the user's selection of the "play again" button 902. A first such opportunity is illustrated in FIG. 10. By selecting sponsor link 9102, the sponsor's web site is displayed in a frame in the user's browser. In return for directing the user to the sponsor's web site, the system receives revenue from the sponsor. A portion of the revenue received is allocated to the prize budget, and the odds management component 107 increases the user's probability of winning in response.

Figure 11:
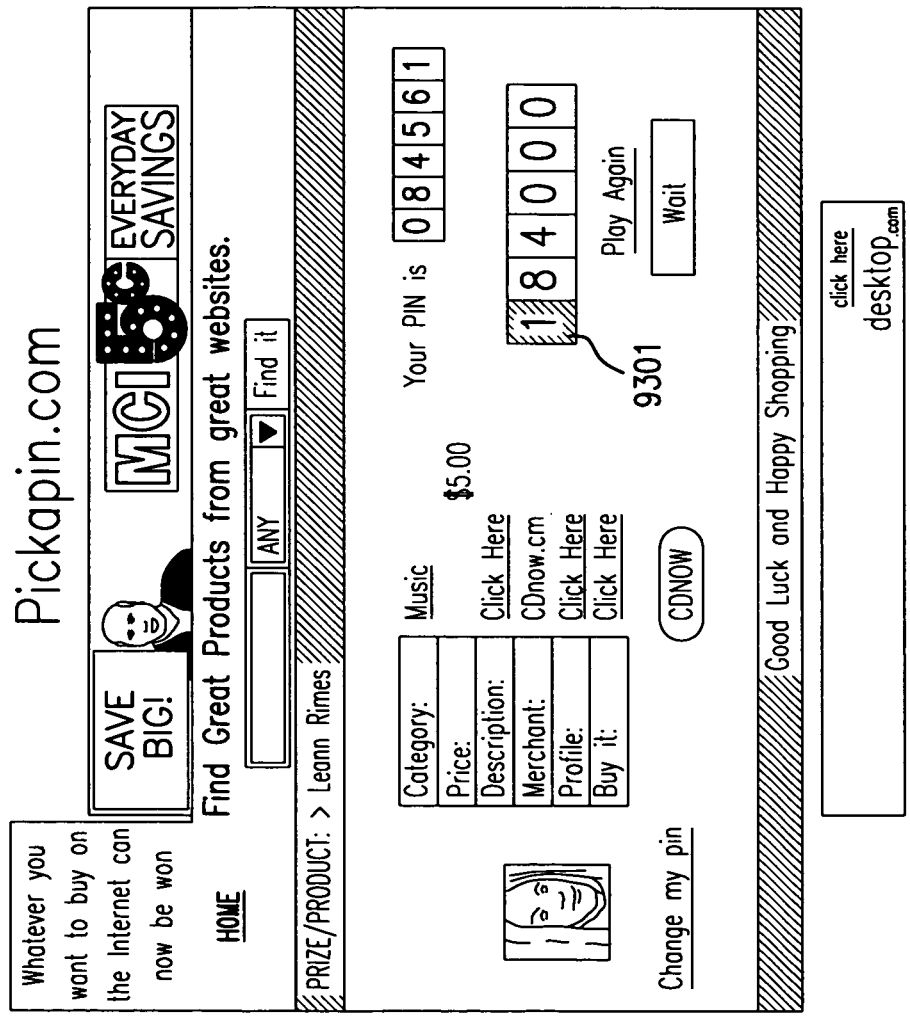
FIG. 11 illustrates an example display of an example preferred embodiment.

An increased probability of winning is reflected in the display by "locking in" a digit of the outcome number to match the user's PIN as shown in FIG. 11. The "locked in" status of digit 9301 is signified by a different background display color. The game may be played using the display shown in FIG. 11 as described above in connection with FIG. 10. However, outcome numbers are selected from a reduced range, and the "locked in" digit of the outcome number is not varied. As before, the user's probability of winning is preferably varied independently of the selection of outcome numbers. The "locked in" digit thus signifies that the user's probability of winning has increased, but not the magnitude of the increase. As a user's probability of winning increases, for example, through continued play, multiple digits may be "locked in" to signify the increased probability of winning.

In a preferred aspect of the present invention, the odds management component 107 may award an unsuccessful user a consolation prize. Preferably, the odds management component 107 determines to award a consolation prize based on the frequency of visits, participation in odds-increasing opportunities presented, and demographic information stored in the user's profile. The type of consolation prize may be selected based on preferences determined from the user's profile. Preferably, the odds management component 107 awards a consolation prize after threshold number of attempts to win has been exceeded and the user has generated more revenue for the system than the cost of the consolation prize and its associated expenses.

It should be understood that this invention is not limited to the disclosed features and other similar method and system may be utilized without departing from the spirit and the scope of the invention.

While the invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the invention is capable of being embodied in other forms without departing from its essential characteristics.

The invention claimed is:

1. A method of providing a user with a game of chance, the method comprising the steps of:
    receiving electronic signals from a user system representing search parameters descriptive of a product;
    retrieving a plurality of product information from at least one database storing independent third-party retail vendor product information;
    transmitting electronic signals to the user system representing the retrieved plurality of product information and associated prices;
    automatically providing the user with an option to play a game to win a selected product from the retrieved plurality of product information without the user first making any payment or requesting the option;
    electronically calculating a dynamic probability of winning the selected product by the user based on one or more factors selected from a group consisting of: the cost of the selected product in relation to the total cost of all products available, a current prize budget, a ratio of the current prize budget to a total amount of funds received, and the user's behavior during a user session;
    electronically and randomly generating a trial outcome of an event trial, the probability of the event trial generating a winning trial outcome corresponding to the calculated probability of winning;
    generating an outcome indicator, wherein the outcome indicator is generated independently of the trial outcome, and wherein the outcome indicator is representative of a winning trial outcome or a losing trial outcome, and further wherein the outcome indicator for a winning trial outcome has a distribution associated with a first statistical distribution and the trial outcome has a distribution associated with a second statistical distribution, and further wherein the first statistical distribution has a distribution which is different from the second statistical distribution;
    displaying the outcome indicator to the user; and in response to a winning trial outcome, purchasing the selected product for the user from the independent third-party retail vendor at no cost to the user; and
    in response to a losing trial outcome, automatically providing the user with an option to play another game to win a different product from the retrieved plurality of product information without the user first making any payment.

2. The method of claim 1, wherein the probability of winning on successive plays of the game increases with the value derived from the user's interaction with the system.

3. The method of claim 1, wherein the display comprises a user-chosen number and a comparison number, such that a winning outcome is indicated by displaying a comparison number that matches the user-chosen number, and a losing outcome is indicated by displaying a comparison number that does not match the user-chosen number.

4. The method of claim 3, wherein an increased probability of winning on successive plays of the game is indicated by displaying a comparison number having at least one digit matching the corresponding at least one digit of the user-selected number.

5. The method of claim 3, wherein the probability of winning is different than one divided by ten raised to the power of the number of digits in the comparison number.

6. The method of claim 1, comprising providing the user with an opportunity to increase the chances of winning by performing a task for which a third party provides compensation to the provider of the game of chance.

7. The method of claim 1, comprising calculating a probability of winning based on at least a current budget.

8. The method of claim 1, comprising calculating a probability P of winning based on a total number of game players.

9. The method of claim 1, comprising calculating a probability P of winning based on:

$$P = \frac{P_a * P_t * P_m}{N} + P_u$$

where:
$P_a$ is a probability factor that varies with the cost of the selected product in relation to the total cost of all products available;
$P_t$ is a probability factor that varies with a current prize budget;
$P_m$ is a probability factor that varies with a ratio of the current prize budget to a total amount of funds received;
$P_u$ is probability factor that varies with the user's behavior during a user session; and
N is a number of current users.

10. A method of providing a user with a game of chance, the method comprising:
    receiving electronic signals from a user system representing at least one search parameter descriptive of a product;
    retrieving at least one product information from at least one database storing independent third-party retail vendor product information;
    transmitting electronic signals to the user system representing at a least one product, a price of the product and the independent third-party retail vendor of the product;

automatically transmitting electronic signals representing at least a first option for the user to play a game to win the product without the user first making any payment or requesting the first option, and a second option to purchase the product;

if the user chooses to play the game:

electronically calculating a dynamic probability of winning the product by the user based on one or more factors selected from a group consisting of: the cost of the selected product in relation to the total cost of all products available, a current prize budget, a ratio of the current prize budget to a total amount of funds received and the user's behavior during a user session;

electronically generating a trial outcome, the probability of the trial outcome generating a winning trial outcome corresponding to the calculated probability of winning;

generating an outcome indicator, wherein the outcome indicator is generated independently of the trial outcome, and wherein the outcome indicator is representative of a winning trial outcome or a losing trial outcome, and further wherein the outcome indicator for a winning trial outcome has a distribution associated with a first statistical distribution and the trial outcome has a distribution associated with a second statistical distribution, and further wherein the first statistical distribution has a distribution which is different from the second statistical distribution;

displaying the outcome indicator to the user; and in response to a winning trial outcome, purchasing the product for the user from the independent third-party retail vendor at no cost to the user;

in response to a losing trial outcome, automatically providing the user with an option to play another game to win a different product from the retrieved plurality of product information without the user first making any payment; and if the user chooses to purchase the product instead of playing the game:

directing the user to a web site which sells the product.

11. The method of claim 10, comprising providing the user with an opportunity to increase the chances of winning on successive plays of the game by performing a task for which a third party provides compensation to the provider of the game of chance.

12. The method of claim 10, comprising calculating a probability P of winning based on a total number of game players.

13. The method of claim 10, comprising calculating a probability P of winning based on:

$$P = \frac{P_a * P_t * P_m}{N} + P_u$$

where:

Pa is a probability factor that varies with the cost of the selected product in relation to the total cost of all products available;

Pt is a probability factor that varies with a current prize budget;

Pm is a probability factor that varies with a ratio of the current prize budget to a total amount of funds received;

Pu is probability factor that varies with the user's behavior during a user session; and N is a number of current users.

14. A method for increasing user traffic to a search website, comprising:

providing a search webpage containing a search interface for a user to submit search parameters descriptive of a product;

receiving electronic signals from the user representing said search parameters, said parameters submitted through said search webpage;

retrieving a plurality of product information and associated prices from at least one database storing independent third-party retail vendor product information;

displaying each of the plurality of product information as a separate weblink for selection by the user system;

automatically providing a user the option to play a game to win a product from the retrieved plurality of product information in response to a user selection of at least one weblink without the user first making any payment or requesting the option;

electronically calculating a dynamic probability of winning the product by the user based on one or more factors selected from a group consisting of: the cost of the selected product in relation to the total cost of all products available, a current prize budget, a ratio of the current prize budget to a total amount of funds received, and the user's behavior during a user session;

electronically and randomly generating a trial outcome of an event trial, the probability of the event trial generating a winning trial outcome corresponding to the calculated probability of winning;

generating an outcome indicator, wherein the outcome indicator is generated independently of the trial outcome, and wherein the outcome indicator is representative of a winning trial outcome or a losing trial outcome, and further wherein the outcome indicator for a winning trial outcome has a distribution associated with a first statistical distribution and the trial outcome has a distribution associated with a second statistical distribution, and further wherein the first statistical distribution has a distribution which is different from the second statistical distribution;

displaying the outcome indicator to the user; and in response to a winning trial outcome, purchasing the selected product for the user from the independent third-party retail vendor at no cost to the user; and in response to a losing trial outcome, automatically providing the user with an option to play another game to win a different product from the retrieved plurality of product information without the user first making any payment.

15. The method of claim 14, wherein the probability of winning on successive plays of the game increases with the value derived from the user's interaction with the system.

16. The method of claim 14, wherein the display comprises a user-chosen number and a comparison number, such that a winning outcome is indicated by displaying a comparison number that matches the user-chosen number, and a losing outcome is indicated by displaying a comparison number that does not match the user-chosen number.

17. The method of claim 16, wherein an increased probability of winning on successive plays of the game is indicated by displaying a comparison number having at least one digit matching the corresponding at least one digit of the user-selected number.

18. The method of claim 14, comprising calculating a probability of winning based on at least a current budget.

19. The method of claim 14, comprising calculating a probability P of winning based on a total number of game players.

20. The method of claim 14, comprising calculating a probability P of winning based on:

$$P = \frac{P_a * P_t * P_m}{N} + P_u$$

where:
- $P_a$ is a probability factor that varies with the cost of the selected product in relation to the total cost of all products available;
- $P_t$ is a probability factor that varies with a current prize budget;
- $P_m$ is a probability factor that varies with a ratio of the current prize budget to a total amount of funds received;
- $P_u$ is probability factor that varies with the user's behavior during a user session; and
- N is a number of current users.

* * * * *